1## United States Patent [19]

Göte et al.

[11] Patent Number: 4,528,309
[45] Date of Patent: * Jul. 9, 1985

[54] METHOD FOR THE PRODUCTION OF CELLULOSIC BOARD MATERIALS

[75] Inventors: Helgesson Göte, Vallentuna; Månsson Björn, Sundsvall; Wallin Nils-Håkan, Vällingby, all of Sweden

[73] Assignee: AB Casco, Stockholm, Sweden

[*] Notice: The portion of the term of this patent subsequent to Oct. 23, 2001 has been disclaimed.

[21] Appl. No.: 538,815

[22] Filed: Oct. 5, 1983

Related U.S. Application Data

[63] Continuation of Ser. No. 363,624, Mar. 30, 1982, abandoned.

[30] Foreign Application Priority Data

Apr. 28, 1978 [SE] Sweden ................ 7804942

[51] Int. Cl.$^3$ .............. C08L 1/02; B29J 5/00
[52] U.S. Cl. ........................ 524/13; 524/62; 264/109; 264/128; 428/396; 428/407; 428/528; 156/62.2; 156/327
[58] Field of Search ............ 524/13, 16, 27, 35, 524/62; 264/109, 128; 428/396, 407, 528; 156/62.2, 327

[56] References Cited

U.S. PATENT DOCUMENTS

| | | | |
|---|---|---|---|
| 2,527,795 | 11/1950 | Caughey | 524/13 |
| 3,649,397 | 3/1972 | Peters | 156/62.2 |
| 3,905,847 | 9/1975 | Black | 156/62.2 |
| 4,285,843 | 8/1981 | Mayerhoffer | 524/13 |
| 4,299,877 | 11/1981 | Smart | 156/327 |

FOREIGN PATENT DOCUMENTS

| | | |
|---|---|---|
| 2740207 | 11/1978 | Fed. Rep. of Germany . |
| 2069609 | 9/1971 | France . |
| 642211 | 1/1979 | U.S.S.R. . |

*Primary Examiner*—John Kight
*Assistant Examiner*—Nathan M. Nutter
*Attorney, Agent, or Firm*—Fred Philpitt

[57] ABSTRACT

A method for producing board materials of cellulose containing components using formaldehyde-based curable glues. By treatment of at least one part of the components at a low moisture content with a formaldehyde absorbing agent the board materials obtained after pressing get a low content of free formaldehyde and very good strength properties. The moisture content of the components at the treatment is lower than 12 percent by weight. the formaldehyde absorbing agent is preferably urea.

5 Claims, No Drawings

METHOD FOR THE PRODUCTION OF CELLULOSIC BOARD MATERIALS

This is a continuation of application Ser. No. 363,624, filed Mar. 30, 1982 abandoned and the benefits of 35 USC 120 are claimed relative to it.

TECHNICAL FIELD

The present invention relates to a method for producing products based on cellulosic materials such as particleboards and the like. Products prepared according to the method have good strength properties and a very low content of free formaldehyde which results in a substantially reduced tendency to release formaldehyde to the surroundings. The invention also relates to a composition for carrying out the process.

BACKGROUND ART

For the production of board materials, such as particleboards, curable formaldehyde based glues are generally used and these glues are cured by means of acids or acid forming compounds. Urea-formaldehyde resins are mainly used for the gluing, but melamine-formaldehyde resins, mixtures of urea and melamine resins, mixed condensates of urea, melamine and formaldehyde as well as mixed condensates containing phenolic compounds can also be used. From all these glues formaldehyde can be released at the manufacturing of the products or at the subsequent use of these.

It is well known that formaldehyde is irritating and causes allergy and it is thus, with respect to occupational and environmental hygiene, desired to reduce the amount of free formaldehyde to the greatest possible extent and also desired to absorb the formaldehyde which can be emitted from the cured glue. A number of different methods for reducing the content of free formaldehyde have been suggested, e.g. addition of formaldehyde absorbing substances to the glue compositions or to the cellulose material at the board production, post-treatment of the finished products, use of glues with a low mole ratio.

The last mentioned method is in particular true about the use of urea-formaldehyde resins, whereas previously resins with a molar ratio of urea to formaldehyde substantially within the range of from 1:1.4 to 1:1.8 were used, nowadays resins with a molar ratio about or below 1:1.4 are used instead to a great extent. Despite the reduced mole ratio certain amounts of free formaldehyde will still exist and it is not possible to lower the mole ratio too far to avoid the problems of free formaldehyde, as other properties, particularly the tensile properties of the board materials, would then be negatively influenced. Low mole ratios do also impair the storability of the resin, the dilutability etc.

Additions of urea or other formaldehyde absorbing agents to the resin before the use thereof have also been employed, but also this method does of course lead to a lowered mole ratio with the consequence that the strength properties of the produced boards are impaired. Further, addition of formaldehyde absorbing agents to the particles before, during or following the gluing of these has been employed. If, for example, particles that have not been glued are sprayed with a formaldehyde absorbing agent at such conditions that substantial amounts of the agent will be present on the surfaces of the particles this will, in a manner corresponding to that of addition to a glue composition, have a detrimental effect on the glue which is used and thereby also on the properties of the manufactured products.

DISCLOSURE OF THE INVENTION

It has now been found that it is essential to keep the formaldehyde absorbing agent separate from the glue during the curing thereof to the greatest possible extent, in order to obtain reproducible results with respect to strength properties at industrial production of e.g. particleboard. According to the invention this is accomplished by treating the cellulosic components with a formaldehyde absorbing agent at a low moisture content. The formaldehyde absorbing agent will hereby penetrate into the cellulose particles instead of being retained on their surfaces. When the particles are glued later on, and the glue is cured during the pressing, the curing process will be essentially uninfluenced by the formaldehyde binding agent and reproducible and good tensile properties of the board materials will be obtained. Board materials produced according to the invention also appear to possess improved properties with respect to release of formaldehyde, in that the actual emission from the produced board materials during a longer period of time is substantially reduced.

Chips for the production of particleboards have a very high and varying moisture content originally, generally within the range 30 to 120 percent. The moisture content must be reduced to values below these so that the total moisture content, after addition of glue, at the board production will not exceed the, e.g. for delamination due to vapour, critical limit of about 14 percent.

If particles having the above mentioned moisture contents of 30 to 120 percent are treated with a formaldehyde absorbing agent this will penetrate into the particles in a non-uniform manner and most of it will be retained on the surfaces of the particles. A subsequent strong drying of the particles will, due to the chromatography effects that occur, cause formaldehyde absorbing agent that may have penetrated the particles to migrate towards the surfaces. The formaldehyde absorbing agent will then, after gluing of the particles, take part in the curing process and reproducible results with respect to tensile properties will not be obtained.

A method of this kind is described in the German Auslegeschrift No. 1 055 806 according to which chips of a high moisture are treated with formaldehyde binding agent, whereafter the chips are dried to a moisture content suitable for board production and glued. A similar method is described in the German patent application No. 1 653 167 according to which a minor part of the chip material is treated with an aqueous dispersion of melamine as formaldehyde absorbing agent. As melamine is not soluble in water, particles treated according to this method will show the formaldehyde absorbing agent on their surfaces.

According to the present method for the production of cellulosic board materials using formaldehyde absorbing agents and adding these to cellulose components of low moisture content before the gluing, a maximum penetration of the formaldehyde absorbing agent is achieved. In addition to reduced release of formaldehyde at board production and finished products having low contents of free formaldehyde, products having good and reproducible strength properties are obtained by the method according to the invention. As the formaldehyde absorbing agent, in contrast to previously known methods, is not brought into direct contact with the used glue, this and its curing is not influenced to any substantial extent whereby products having more uniform and reproducible strength are obtained. The invention provides a method for producing, in a reproducible manner, board materials having good tensile properties and a very low content of free formaldehyde whereby the fluctuations and impairment of the strength which can occur e.g. at treatment of chips of high moisture contents are avoided. The present process is especially advantageous when glues with low mole ratios are used as hereby otherwise a further decrease of the mole ratio gives rise to substantially impaired strength properties. In products prepared according to the process wherein the formaldehyde absorbing agent has penetrated into the individual components the mobile released formaldehyde will be efficiently absorbed by the agent. Products prepared according to the process will also have good dimensional stability. A further advantage is that the tendency to hydrolysis of the used glue will be reduced as its mole ratio is not influenced in any appreciable extent.

The present invention thus relates to a method for the production of cellulosic board materials by pressing cellulosic components glued with curable formaldehyde-based glues, whereby at least a part of the components have been treated with a formaldehyde absorbing agent before the gluing and it is characteristic of the process that treatment with the formaldehyde absorbing agent is carried out at a low moisture content of the cellulosic components. In its widest scope the moisture content of the cellulosic components is adjusted in order that at treatment with the formaldehyde absorbing agent, the components, after gluing, have a moisture content of maximum 14 percent by weight.

The moisture content of the cellulose components should at the treatment with formaldehyde absorbing agent be below 12 percent by weight in order to obtain the desired penetration and in order that subsequent drying with respect to the at board production acceptable moisture content should not be necessary. The moisture content is suitably within the range 0 to 6 percent by weight and preferably within the range 1 to 3 percent by weight. Considering the original high moisture content of e.g. wood chips the cellulose material must normally be dried before the treatment with formaldehyde absorbing agent. The drying can for example be carried out by hot air blowing, whereby the material after drying will have a temperature of about 80° to 100° C. The temperature of the material at the treatment according to the invention is not critical but can vary within wide limits, from ambient temperature to the temperature the material has directly after drying. The treatment can for example be carried out at temperatures within the range of from 15° to 90° C. A certain improvement of the strength properties of the produced products has been observed when the treatment is carried out at a lower temperature and the treatment is thus suitably carried out at a temperature of the cellulose components within the range 20° to 60° C.

According to the invention cellulose components and cellulose containing components refer to products of wood and other not delignified cellulose containing materials which have been mechanically broken down, e.g. wood chips, saw dust, cutter shavings, cut-up products of flax, bagasse, sugar-canes, and other coarser or finer wood fibre materials etc. Chips is the preferred cellulose material.

Broad materials comprising more than one layer can be produced according to the invention. It is also within the scope of the invention that only one part of the amounts of components in the board materials is treated with formaldehyde absorbing agent. However, for one-layer panels the whole amount of cellulose components is suitably treated and for multi-layered panels the whole amount of cellulose components for at least one layer. For three- and multi-layer boards only the middle layer or middle layers, can be treated with satisfactory results as these because of their porosity, is the weakest part with regard to strength.

The present process can be employed for all the different generally used formaldehyde-based glues such as urea-formaldehyde resins, melamine-formaldehyde resins and mixtures of these resins, co-condensates of urea, melamine and formaldehyde, and co-condensates containing phenolic products such as phenol, resorcinol and sulphite liquor. At the production of board materials according to the invention urea-formaldehyde resins or urea-melamine-formaldehyde resins are suitably used.

As treating agents known compounds capable of binding formaldehyde can be used. As examples of such compounds can be mentioned nitrogen containing compounds such as melamine, diazine-, triazine- and amine-compounds. It is essential that the compounds can penetrate the cellulose components and it might thus in some cases be necessary to use solvents having a suitable volatility temperature, e.g. alcohols. Water soluble compounds are preferably used and particularly good results have been obtained with urea, which compound, besides absorbing formaldehyde very efficiently, also is advantageous with regard to environmental aspects and for economic reasons.

After treatment with the formaldehyde absorbing agent the cellulose components should not be dried before the gluing as hereby otherwise the formaldehyde absorbing agent which has penetrated into the components would migrate towards the surfaces with above discussed negative effects as a consequence. If drying is necessary it must be carried out under controlled and mild conditions. The concentration of the formaldehyde absorbing agent in the applied water solutions should be adjusted in order to avoid subsequent drying. The amount of applied formaldehyde absorbing agent, considered as dry and based on dry cellulose material, is suitably within the range 0.2 to 2 percent by weight and preferably within the range 0.5 to 1.5 percent by weight.

When the treatment is carried out with aqueous solutions of the formaldehyde absorbing agent care should also be taken that the water content is kept at a low level, in order that the penetration into the components will reach a maximum. When working with solutions of urea it is suitable to use concentrations of 20 to 50 percent by weight and preferably 30 to 50 percent by weight. In order to increase the concentration of formaldehyde absorbing agents in solutions without risking precipitation heating can be relied on in a known manner. A suitable manner of applying formaldehyde absorbing agents to cellulose material with a moisture content below 12 percent by weight according to the invention is to combine the formaldehyde absorbing agent with other conventional additives used at board production and hereby reduce the amount of added liquid. The formaldehyde absorbing agent can e.g. be applied admixed with the solution of the curing agent for the glue or in solutions of wood preservatives etc. It is particularly suitable to add the formaldehyde absorbing agent in an intimate mixture with a hydrophobing agent.

Dispersions of paraffin waxes are often used as hydrophobing agents at the production of particleboards or other board materials and these dispersions are added admixed with the glue or separate before the gluing. Generally paraffin wax dispersions having wax concentrations of 25 to 65 percent are used and they are added to give about 0.1 to 1 percent by weight of dry wax based on dry chips. The wax dispersions can be anionic, nonionic or cationic. These dispersions are well-known commercial products and they may in addition to the used charged or un-charged emulsifier contain protective colloids such as carboxymethylcellulose, gelatine etc. Formaldehyde absorbing agents such as urea can be mixed into these dispersion by simple mechanical mixing. It is extremely suitable to add the formaldehyde absorbing agent via an intimate mixture with a wax dispersion as hereby not only the total amount of added liquid is reduced but as also a protective layer of wax around the cellulose components is obtained and this further contributes to keeping the formaldehyde absorbing agent separate from the glue. The present invention also relates to a composition for producing cellulose-based board materials and this composition comprises an intimate mixture of formaldehyde absorbing agent, wax and water. The formaldehyde absorbing agent is preferably urea and the wax dispersion is suitably anionic or nonionic. A suitable dispersion for the treatment according to the invention contains 5 to 50 percent by weight of wax and 5 to 50 percent by weight of urea. Urea-wax mixtures are suitably used in dispersions having dry contents of 40 to 65 percent.

After treatment according to the invention gluing with formaldehyde-based curable glues is carried out in a conventional manner and pressing for obtaining the board materials is carried out at usual pressures and temperatures.

Urea-formaldehyde resin or urea-melamine-formaldehyde resin is suitably used as the glue, as previously mentioned. According to a preferred embodiment of the present invention the glue is a urea-formaldehyde resin having a low mole ratio of urea to formaldehyde as these resins in themselves give a relatively low content of free formaldehyde and as it for these resins is most important not to influence the mole ratio, which is avoided by the treatment according to the invention. Low mole ratios here refer to resins having a ratio of urea to formaldehyde within the range 1:1.1 to less than 1:1.4 and suitably within the range of 1:1.20 to 1:1.35.

The invention is described more in detail in the following examples which, however, are not intended to limit the same. Percent and parts relate to percent by weight and parts by weight unless otherwise indicated.

EXAMPLE 1A–D

In all the test boards having the dimensions 500××330×16 mm were prepared by pressing particles glued with a urea-formaldehyde resin having a mole ratio of urea to formaldehyde of 1:1.3. The press time was 7.7 seconds per mm and the press temperature was 185° C.

The values shown in the table are average values for 6 boards. The measurements were made four days after the production of the boards. The content of free formaldehyde was measured with FESYP Perforation-Method, described e.g. in British Standard 1811. Swelling and internal bond were measured according to DIN 68761. The reference in each separate test relates to boards produced at identical conditions but without added formaldehyde absorbing agent. In all other cases urea in an amount of 1 percent by weight based on dry particles was used as the formaldehyde absorbing agent.

EXAMPLE A AND B

These examples relate to production of single-layered boards of wood particles. The urea was added as a 40 percent aqueous solution. 150 grams 60% resin solution was used per 1000 grams of chips and the curing agent was a 20% ammoniumchloride solution added to 1.9% based on dry resin.

EXAMPLE C

One-layered boards were prepared with an amount of glue corresponding to that used in example A and B. Urea was added to the chips in a wax dispersion. Totally 33 grams of a wax dispersion containing 12 percent wax and 30 percent urea was added.

EXAMPLE D

In this test three-layered boards were prepared with urea-treatment of the middle layer. The urea was added by means of a wax dispersion according to example C and for gluing of this layer 125 grams of a 60% resin was used. The surface layers were glued with 200 grams 60% resin. 1 percent ammonium chloride was used as curing agent and as hydrophobing agent for these layers 8 grams of wax per 1000 grams of particles were used.

| Example | Moisture content of particles at addition of urea % | Particle temperature °C. | Swelling % | Internal bond MPa | Change in internal bond % | Content of free formaldehyde % |
|---|---|---|---|---|---|---|
| Reference A | 1.4 | 80<br>80 | 3.1<br>3.2 | 0.70<br>0.79 | +13% | 0.038<br>0.017 |
| Reference B | 1.4 | 30<br>30 | 3.2<br>2.7 | 0.70<br>0.83 | +20% | 0.034<br>0.017 |
| Reference C | 1.2 | 30<br>30 | 5.2<br>4.6 | 0.53<br>0.66 | +25% | 0.035<br>0.014 |
| Reference D | 1.2 | 30<br>30 | 3.9<br>3.9 | 0.64<br>0.67 | +5% | 0.039<br>0.019 |

EXAMPLE 2

In a full-schale board manufacturing process, three-layer boards were produced in a press with a size of 7500×2500 mm. To the middle layers of boards in this process were added urea by means of a wax dispersion to give an amount of 10 g urea per 1000 g of dry particles. Corresponding glue and wax and amounts as in Example 1 D were used. Reference boards were produced immediately before and immediately after the urea-treated boards to give the same treating conditions with respect to temperature, pressure, amount of glue, particle quality etc. with the only difference that these boards were treated with a wax dispersion without urea. Some conditions and properties are listed below:

| | Moisture content of particles at addition of wax dispersion % | Particle temperature °C. | Swelling % | Internal bond MPa | Content of free formaldehyde % (perforator-value) |
|---|---|---|---|---|---|
| Reference | 1.6 | 20 | 3.0 | 0.64 | 0.024 |
| Boards treated according to the invention | 1.6 | 20 | 3.6 | 0.64 | 0.013 |

To determine the emission of formaldehyde from the boards to the surrounding environment 5 boards of the dimensions 2500×1250 mm were all placed on edge and with their front surfaces freely exposed to the air in closed steel chambers with an air volume of 15 m$^3$. The chambers were equipped with fans and thermoregulators but without means for air exchange with the exterior. Air samples were taken frequently until an equilibrium was reached. There was no ventilation of the chambers.

After 2 days without ventilation at 20° C. and 40% relative humidity, the load in the steel chambers being 1 m$^2$ of board per m$^3$ of air, the formaldehyde concentration in the air was measured and found to be 0.80 ppm for the reference and 0.40 ppm for the boards treated according to the invention. This means a 50% reduction with the relatively small urea addition.

We claim:

1. A method for the production of cellulosic board materials from cellulose containing components bonded by formaldehyde-based glues, comprising the steps of:
   (a) providing a cellulosic particulate material in the form of chips, sawdust or cutter shavings, such material having a moisture content below 6 percent by weight,
   (b) mixing at least a part of the material from step (a) with a water dispersion, containing between 5 and 50 percent by weight of wax and 5 to 50 percent by weight of urea, the concentrations being adapted to avoid subsequent drying of the material, in an amount sufficient to give between 0.2 and 2 weight percent of dry urea calculated on dry cellulosic material, so that the urea penetrates into and is retained in the particulate material,
   (c) adding a urea-formaldehyde glue with a mole ratio of formaldehyde to urea within the range of 1.1:1 to 1.4:1, or such a glue modified with melamine to the particulate cellulosic material after the formaldehyde absorbing material has penetrated into the particulate cellulosic material,
   (d) shaping the material resulting from step (c) and having a moisture content below 14 percent by weight into a desired form, and
   (e) consolidating the shaped material by application of heat and pressure into a cellulosic board.

2. The method of claim 1 wherein the moisture content is within the range of about 1 to 3 percent by weight.

3. The method of claim 1 wherein the solid content of the dispersion is between 40 and 65 percent by weight.

4. The method of claim 1 wherein the dispersion is anionic or nonionic.

5. The method of claim 2 including the step of treating the total amount of cellulose containing components in at least one layer of a multi-layer board with urea.

* * * * *

UNITED STATES PATENT AND TRADEMARK OFFICE
CERTIFICATE OF CORRECTION

PATENT NO. : 4,528,309
DATED : July 9, 1985
INVENTOR(S) : Gote Helgesson et al.

It is certified that error appears in the above-identified patent and that said Letters Patent is hereby corrected as shown below:

On the title page, item /75/ should read

-- /75/ Inventors: Gote Helgesson, Vallentuna;

Bjorn Mansson, Sundsvall;

Nils-Hakan Wallin; Vallingby, all of Sweden --.

Signed and Sealed this

Nineteenth Day of November 1985

[SEAL]

Attest:

DONALD J. QUIGG

Attesting Officer

Commissioner of Patents and Trademarks